United States Patent [19]
Hansen

[11] 3,899,046
[45] Aug. 12, 1975

[54] COUPLING ELECTRIC LINE INSIDE OF FLUID CONDUIT

[75] Inventor: Howard C. Hansen, Battle Creek, Mich.

[73] Assignee: Clark Equipment Company, Buchanan, Mich.

[22] Filed: July 3, 1974

[21] Appl. No.: 485,394

[52] U.S. Cl................. 187/9 E; 174/19; 174/47; 174/77 R; 174/90; 214/620; 214/650 R; 214/674
[51] Int. Cl.².... B66F 9/20; B66B 9/20; F16L 11/12
[58] Field of Search.......... 174/15 C, 19, 20, 21 R, 174/22 R, 23 R, 47, 65 SS, 75 R, 77 R, 84 C, 90; 187/9 R, 9 E, 29 A; 214/62 D, 650 R, 651-655, 670, 674, 730

[56] References Cited
UNITED STATES PATENTS

| | | | |
|---|---|---|---|
| 646,886 | 4/1900 | Stowe et al. | 174/47 |
| 2,932,419 | 4/1960 | Harris | 187/9 R X |
| 3,314,562 | 4/1967 | Farmer | 214/650 R |
| 3,376,169 | 4/1968 | Davis et al. | 174/65 SS X |
| 3,462,028 | 8/1969 | Pi | 187/9 E X |
| 3,481,498 | 12/1969 | Sturtz, Jr. | 214/620 |
| 3,567,843 | 3/1971 | Collins et al. | 174/65 SS X |
| 3,744,008 | 7/1973 | Castellani | 174/65 SS UX |
| 3,784,722 | 1/1974 | Goodman | 174/15 C |

FOREIGN PATENTS OR APPLICATIONS

| | | | |
|---|---|---|---|
| 1,160,805 | 8/1969 | United Kingdom | 174/47 |

*Primary Examiner*—Laramie E. Askin
*Attorney, Agent, or Firm*—John C. Wiessler

[57] ABSTRACT

An electric line and fluid conduit assembly for use principally with industrial lift trucks embodies insulated electric lines reeved inside a flexible conduit containing a fluid under pressure. The conduit is sealed at an entrance fitting thereof by a grommet. Solid or single-strand wire extends into the grommet from the exterior thereof and is conductively connected to flexible insulated multiple strand wire located inside the conduit. The fluid within the conduit is permitted to flow inside the insulation of the multiple strand wire for the purpose of lubricating the wire and for preventing the clamping together of the multiple wire strands by the fluid pressure in the conduit external of the insulation, thereby prolonging the flexing life of the wire.

20 Claims, 8 Drawing Figures

FIG. 1
FIG. 3
FIG. 5
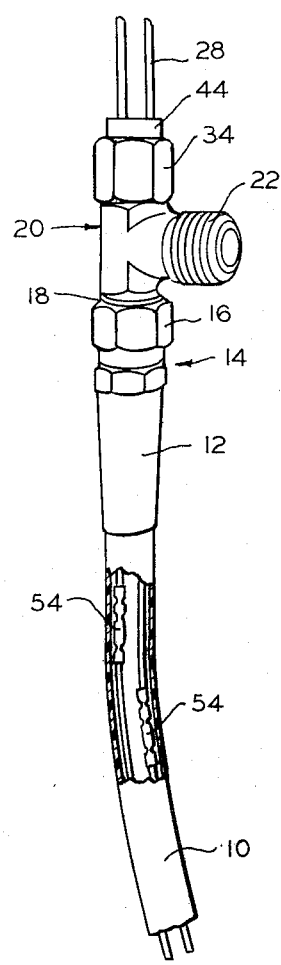
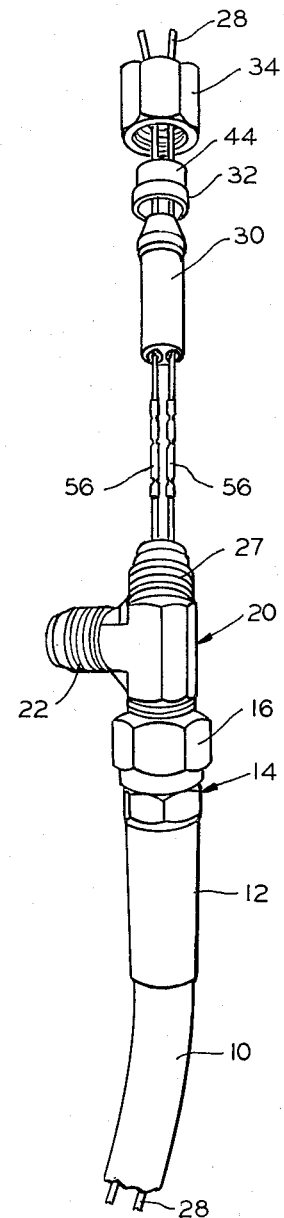
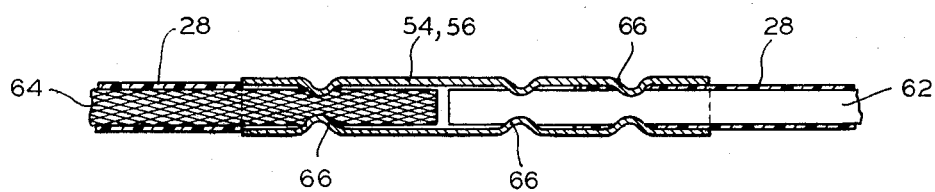

COUPLING ELECTRIC LINE INSIDE OF FLUID CONDUIT

BACKGROUND OF THE INVENTION

In many processes, industrial applications and products, both vehicular and stationary, it is necessary or desirable to provide both electrical and fluid power or controls through lines and conduits which may be connected to devices at one or more common locations and which may be mounted in side-by-side relation over varying distances and under varying conditions.

The efficient routing of such lines and conduits has in some applications involved difficult problems for which various solutions have been heretofore put into practice. For example, in the vehicular field of industrial lift trucks a special problem has been long encountered in the reeving of hydraulic pressure hoses and electrical conductors in telescopic uprights which are used for elevating and manipulating loads in a variety of ways by means of load handling attachments and the like which usually require electrically operated solenoid-controlled hydraulic valves at the fork carriage.

It has been found usually desirable heretofore in lift truck uprights to locate hydraulic conduits and electrical conductors adjacent or functionally connected one to the other in the reeving of the upright to facilitate compactness and simplicity, and in order to minimize the number of parts required, but since the conduits are elastic, they shorten in length substantially when pressurized. The electrical conductors, on the other hand, are substantially non-elastic and so tend to be overstressed or, contrariwise, "bunched" as the elastic conduits shorten and lengthen under the varying pressure conditions encountered in operation.

On the other hand, a separate means of reeving the electrical conduits can be provided in lieu of functionally connecting the two types of conduits in side-by-side relationship, but this necessarily involves many additional parts, increased costs, and reduced compactness and visibility through the upright. For example, electrical reels separate from hydraulic conduit have been often used in lift truck applications, but such reels are costly, bulky and highly subject to damage, as well as being functionally adaptable only for modest maximum fork heights. Electrical cables when reeved within the mast, but separate from the hydraulic conduit, often sustain damage and fail.

SUMMARY

My invention provides an improved means of coupling electric lines to fluid carrying conduits and reeving or threading such lines through the inside of the conduits with entry and exit of the electric lines to and from the conduits in sealed coupling relation. The invention provides electric lines in such conduits of multistrand insulated wire construction interior of which the fluid is introduced for substantially equalizing the fluid pressure interior and exterior of the insulation for prolonging the service life of flexing wire strands. Thus, the interior pressure fluid prevents multiple strands from being compressed tightly together and also lubricates the strands for relative movement between individual strands when the electric line and conduit flex, as during actuation of the reeved liquid pressure supply conduit in the upright of an industrial lift truck during raising and lowering movements of the load carriage thereof.

It is a primary object of the invention to provide improved means for extending the operative life of flexing electric lines reeved inside of flexible fluid conduits.

BRIEF DESCRIPTION OF THE DRAWING

FIG. 1 illustrates in perspective view a portion of a flexible conduit having in assembled coupled relation therewith a pair of electric lines;

FIG. 3 is a perspective view of another embodiment of the invention showing the parts of the coupling in exploded view;

FIG. 5 is an enlarged sectional view of a coupling for wire ends in one of the electric lines hereof;

DETAILED DESCRIPTION

Figure 2:
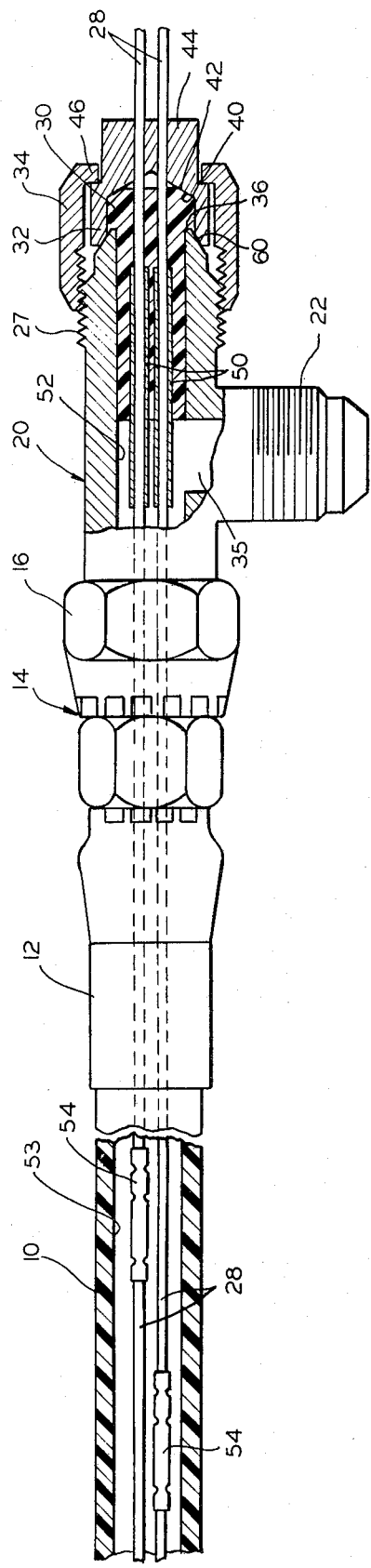
FIG. 2 is an enlarged side view in partial section of FIG. 1.

Referring now to FIGS. 1, 2, 5 and 6, a flexible hydraulic hose 10 having a rigid sleeve end 12 from which is mounted a hose end coupling assembly 14 which includes a threaded swivel-nut 16 is adapted to sealingly engage the one threaded section 18 of a Tee fitting and a coupling 20 at complementary male and female tapered flares in a well-known manner. A threaded projection 22 of fitting 20 is adapted to be connected to a swivel-nut end of any connecting conduit into or from which fluid is to be conducted. Such swivel-nuts are characteristically internally threaded and have a female flare at the lower extremity for sealingly engaging the male end of a flexible hose or other conduit or fitting of a device so that a liquid may flow in either direction through the Tee fitting. Typically such Tee fittings are available in a wide range of standard sizes and in any combination of male end and swivel-nut extremities as may be required. Of course, Y or other shaped fittings may be used as desired so long as at least three separate openings are provided in accordance with my invention.

Additional means is provided for assembly at the upper connecting element to hold in position and compression seal a pair of electric lines 28 which pass therethrough, which means comprises an elongated grommet 30, a metal plug 32 and a nut 34. Grommet 30 is an elongated element preferably of substantial incompressible but deformable material which is inert in whatever fluid is to be conveyed by the conduit 10, and which has parallel openings extending through the length thereof for receiving electric lines 28. The grommet has a collar 36 which both limits and fixes the distance it can be inserted into the Tee fitting connector end 27, having a length which preferably reaches the edge of the intersecting fluid passage 35 through the Tee fitting, but does not protrude into it so as to obstruct fluid flow therethrough. An external surface 40 at the outer end of the grommet has a predetermined shape which, depending upon the application, may be of any suitable shape of rotation, such as conic, spherical, elliptic, parabolic or other. As shown, surface 40 is conical and is adapted to mate with a complementary internal conic surface 42 formed in the metal plug 32 which has a reduced diameter end 44 extending through and outwardly of an opening in nut 34 which has a shoulder recess 46 mating with an internal shoulder of plug 32. Parallel openings through extension 44 align with the openings in grommet 30 for receiving electric lines 28. A pair of metal tubes 50 are inserted in pressed fitting relation in openings provided in the inner end portion of grommet 30, said metal tubes extending into the passageway 52 of the Tee fitting which aligns with fluid passageway 53 of hose 10 and of the coupling end 14, 16 thereof. Tubes 50 receive and guide electric lines 28 into the open portion passage 52 which intersects passage 35 of fitting end 22. The metal support tubes 50 through which lines 28 pass support the lines from vibration; otherwise bending and breaking might result from high velocity and turbulent pressure fluids passing around the corner 35, 52 in Tee fitting 20.

Figure 4:
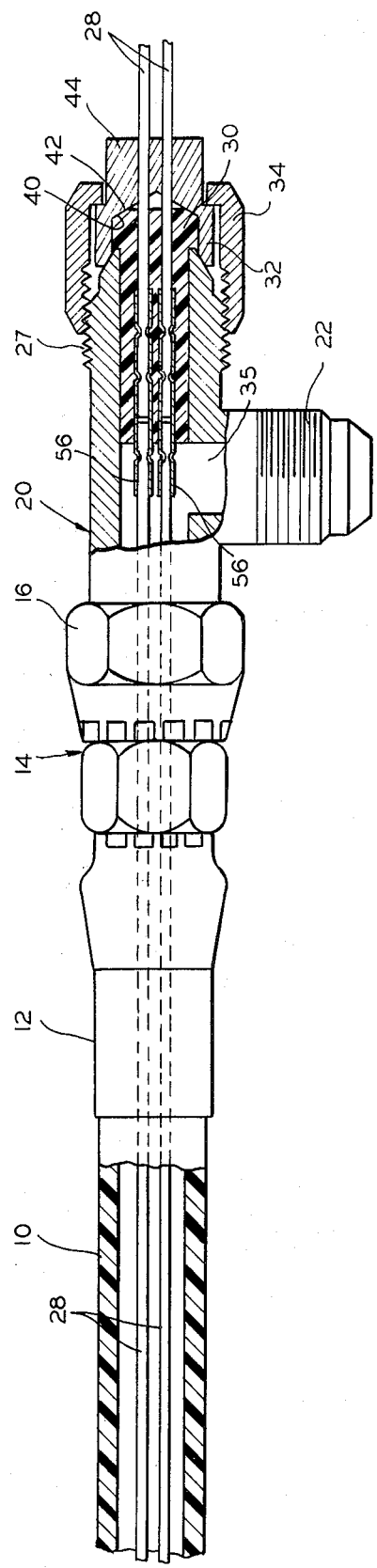
FIG. 4 is an enlarged side view in partial section showing assembled the embodiment of FIG. 3.

The parts as shown in FIGS. 3 and 4 which are the same as corresponding parts in FIGS. 1 and 2 have been similarly numbered. The difference between the two embodiments relates only to differences in the manner of splicing wire ends of lines 28 at a pair of splicing elements 54 as shown in FIGS. 1 and 2 as distinguished from the use of metal tubes such as 50 in splicing elements 56 in FIGS. 3 and 4, as will be described in detail later herein.

With the parts in position as shown in FIG. 2 the sealing and holding action in relation to electric lines 28 and the fluid in the conduit is caused by forces applied in a particular manner to grommet element 30. These forces result from tightening nut 34 along thread 27 which produces near the termination of such movement relatively high thrust forces between the shoulders at 46 tending to force inwardly grommet 30 by transferring the forces from conic surface 42 to conic surface 40. The length of plug 32 is such that the desired force is fully transferred to effect the necessary deformation of the grommet at the time the desired limit occurs, at which time complementary flared metal surfaces at 60 are in contact. In other words, the unstressed grommet is somewhat longer initially than is shown in FIG. 2 and is deformed during tightening of nut 34 so that it completely fills the cavity before the fitting 27 and the plug 32 engage at flared surfaces 60.

FIG. 5 shows the preferred construction of electric lines 28, each of which is comprised of a length of solid or single strand wire 62 and a length of multiple strand wire 64 mechanically and electrically connected together by inserting the ends of wires 62 and 64 into a crimp-splicer conductor tube 54 which is multiple crimped as at 66. The ends of the wires are stripped of insulation, the insulation of wire 64 terminating at the end of crimp-splicer tube 54 as shown, and the insulation of wire 62 preferably extending partially inwardly of the other end of tube 54 beyond the first crimp 66. Crimping the wires in position is preferred to a soldered connection, for example, since I have found that heating and soldering wires intended for flexing cause the wires to become hard and brittle and to fail after a relatively small number of flexures.

The bundle of copper strands in wire designed for flexing, as is wire 64, is twisted or "layed" in a helix arrangement. When such a wire is bent, those strands lying on the outside of the bend are in tension and those lying on the inside are in compression. The helix pattern of the strands imposes the condition that consecutive segments of the same strand alternately undergo compression and tension. Since the lay is not a tight one, and inasmuch as the wire insulation is plastic and relatively loose, portions of each strand can shift slightly from the compressive to the tensional portions, thus greatly relieving these forces. This slight relative movement of the strands of wire 64 is important for extending the life of such flexing wires.

Heretofore the electrical insulation of such wires as 64 has also served as a fluid seal. I have found in practice, however, that fluid pressure in hose 10 external of lines 28 acts to clamp the strands of wire 64 tightly together, thereby substantially inhibiting the above necessary relative movement between the individual strands. Such clamping action drastically shortens the service life of flexing wire, and so I have provided a construction which permits pressure fluid to flow also internally of lines 28 inside of the insulation, which pressure fluid progresses throughout the length of the stranded wire both between the various strands of wire 64 and between the wire and the insulation. Such flow into lines 28 is inherent in the construction as shown in which the end of wire 64 is stripped to the end of splicer tube 54 and provides no fluid seal in respect of the interior of line 28. Thus, the splice or tube construction, or any equivalent means, does and should allow pressure fluid communication between the inside and the outside of the wire insulation so that fluctuating fluid pressure within the hose cannot clamp the wire strands together, and, further, so that the hydraulic fluid flowing inside the stranded wire serves to lubricate the wires during relative movement of the various individual strands. The result is to greatly prolong the service life of the flexing wires. Any other feasible means of communicating the interior of lines 28 with the conduit fluid may, of course, be used, such as slitting or perforating the insulation.

The splicer tubes 54 in the embodiment of FIG. 1 are shown in axially spaced relation in FIG. 2, which spacing is essential in order to prevent short circuiting between lines 28 at splicer tubes 54 which would otherwise occur if the tube conductors 54 were located in side-by-side relation, especially during turbulence of fluid in hose 10. For the same reason it is important in this embodiment that the splicer tubes be located within the hose section 10 and not within any portion of the metal Tee fitting 20 or sleeve extension 12. It will be understood, of course, that electrolytic fluids cannot be used in applications of my invention.

Referring now to the embodiment of FIGS. 3 and 4, the construction, as indicated previously, is the same as in FIGS. 1 and 2 except that I have taken advantage of the presence of metal guide and support tubes 56 pressed into grommet 30 to perform the same function as performed by crimp-splicer tubes 54. That is, the tubes 56 may be utilized to function also as crimp-splicer tube conductors, the same as splicer tubes 54. Of course in the FIG. 4 version the splicer tubes may be located side-by-side, as shown, inasmuch as they are physically maintained apart by grommet 30 so that the possibility of short circuiting between the tubes is eliminated. It is preferred in any design using my invention that the electric lines 28 extend into and through any Tee fitting, or the like, in a straight-line relationship so as to avoid permanent bending of the lines around the corner of the right angle of the Tee fitting, as if the lines 28 entered into the conduit through fitting end 22.

The assembly procedure in the FIG. 4 version is to first measure and cut the multiple strand wires 64 to a desired length, strip the ends, and pull them through the hose 10 normally having Tee fittings on each end thereof. The solid strand wires 62 are then inserted through the unassembled end cap 44 and grommet 30 and into splicer tubes 56, at which time the splicer tubes are crimped to engage and hold wires 62 and 64. The splicer tubes 56 are then press fitted into grommet 30 and the end assembly completed as in FIG. 4.

It is, of course, important that there be no leakage at the end of the Tee fittings through which extend the solid or single strand wires 62 into the atmosphere or, in some applications, into some other medium exterior of the base 10 and fittings. The use of solid or single strand conductors as above-described assures that leakage will not take place even under high fluid pressure conditions in conduit 10. The solid strands and insulation are in a pressure fluid sealed relationship with the sealed grommet 30 and with each other when the Tee fitting is pressure sealed as in FIGS. 2 and 4. If multiple strand conductors 64 were solely used, however, the interior pressure fluid would, of course, leak through the multiple strand wire and through the otherwise sealed end of the Tee fitting and exterior thereof. Any suitable structure can be used for sealing the wire at the Tee fitting, but I have found that the use of single strand conductors splice tube connected to multiple strand conductors as disclosed is most readily applicable to my design, is simple to install, and assures the desired result. However, it is feasible, although not preferred, to eliminate the crimp splice tube members as 54 or 56 and to utilize a single continuous multiple strand wire in each electric line 28, which will necessitate sealing the wire at each Tee fitting such as by stripping and soldering a section of each line 28 within metal tubes 50 so as to provide a fluid pressure seal, or injecting a non-conducting sealing substance into the section of each line 28 within grommet 30 in such a manner as to impregnate and seal the multiple strand wire against fluid pressure leakage.

Figure 6:
FIG. 6 is a sectional view of a portion of a conduit in which an electric line is threaded.

In certain uses of the hydraulic conduits of my invention, such as in supplying pressure liquid to the carriage of a masted fork lift truck, the alternate pressurizing and depressurizing of the flexible hoses cause changes in the length thereof corresponding to the change in hydraulic pressure, so that stretched electric lines 28 would tend to break under resultant alternate lengthening and shortening of the hose. To offset this effect, the lines 28 may be arranged in a serpentine pattern within the hydraulic hoses as required, depending upon the hose diameter and the hydraulic pressure extremes encountered in operation. Such an arrangement is represented in FIG. 6. The bends in the electric lines to produce a serpentine pattern are preferably permanent; that is, they are preferably in the plastic range rather than in the elastic range of the wire. Thus, as the hydraulic conduit varies in length as it is pressurized and depressurized, the bends in the electric lines change incrementally in the elastic range, so that the effective length of each electric line corresponds to the conduit length without stressing the line. If the conduit is of the type which lengthens under pressure and returns to its original length when the pressure is removed, the electric lines should be installed with "bends" so that the effective line length can increase and decrease together with the hose. If, on the other hand, the hose is of a type which shortens under pressure and lengthens when the conduit is depressurized, the electric lines should be installed with no "bends" for the same purpose. Any equivalent means for the above purpose, such as the use of a section of helical coiled wire in the conduit, may be used in place of the serpentine pattern.

Among other advantages of the invention mentioned earlier herein, there are the additional advantages of compactness and ease of assembly and installation, less flexure of electric lines, as in lift truck uprights when they are reeved externally of and parallel to flexing hoses, inherent protection from damage of the electric lines as installed in the fluid conduit, minimization of the number of parts such as separate reeving or specialized sheaves and the like as for separate fluid conduits and electric lines, and the elimination of various special and relatively costly means for solving the problem of relative changes in length between pressure hoses and electric lines. In addition, the instant invention involves in the use of pressure liquid conduits the liquid as a heat sink which serves to cool the electric lines if they are operated at or near electrical capacity. The number of electric lines utilized within a given liquid conduit may vary from one or two or more, although it will be appreciated that the presence of said lines within the conduits and fittings will decrease the hydraulic flow capacity, which decrease may ordinarily be counteracted by a modest increase in the system hydraulic pressure or conduit size, although it will usually be found that the invention may be most practically applied where not more than two electric lines is required in any single fluid conduit.

Figure 7:
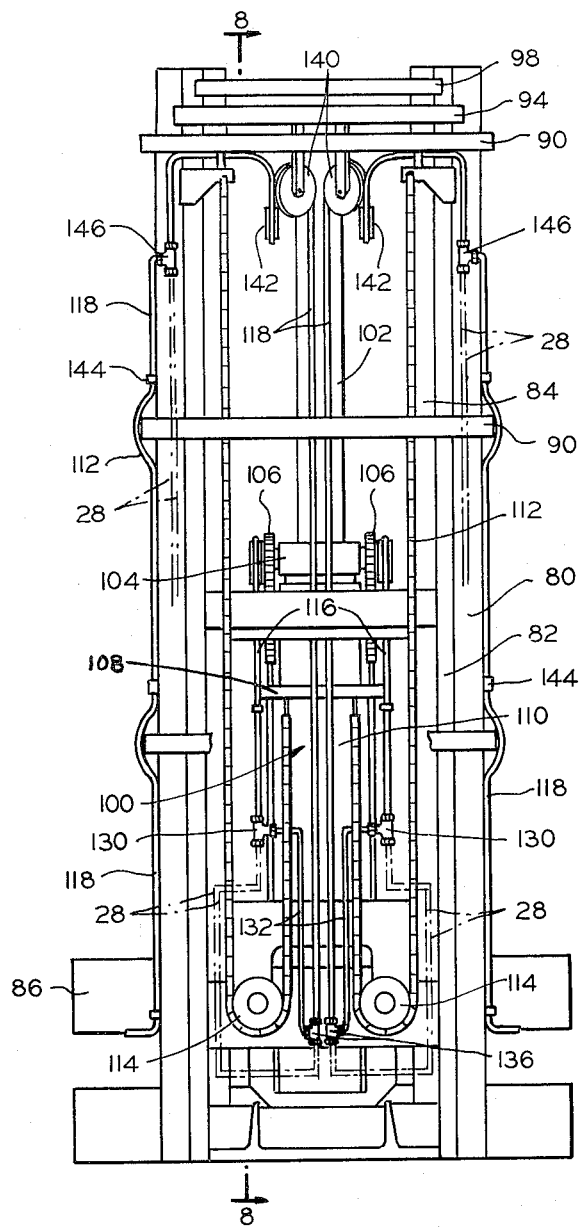
FIG. 7 is an elevational view taken from the rear of a lift truck triple stage upright shown in a collapsed position.
Figure 8:
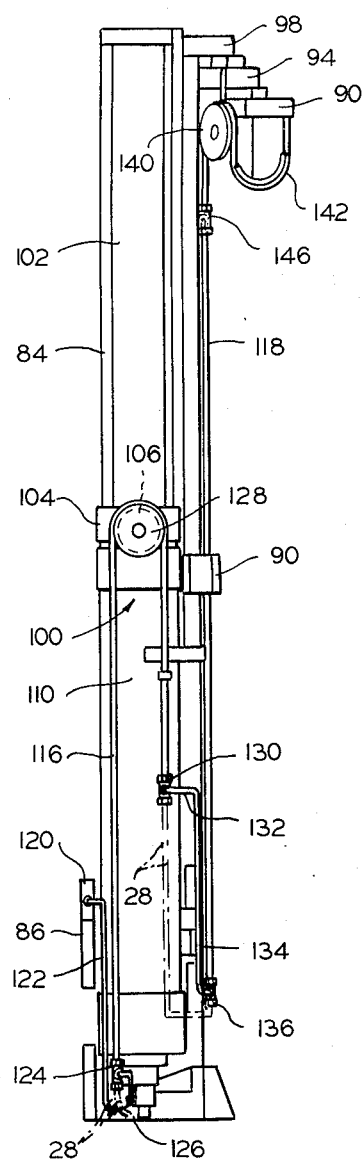
FIG. 8 is a cross-sectional view taken along line 8—8 of FIG. 7.

Referring now to FIGS. 7 and 8, a specific application is illustrated in the lift truck upright disclosed, which is merely exemplary of a large number of possible applications of the invention. The upright structure is disclosed fully in U.S. Pat. No. 3,481,498, FIGS. 7 and 8 hereof corresponding to FIGS. 2 and 3 of said patent except for the incorporation of the present invention.

The upright assembly includes an outer fixed mast section 80 adapted to be mounted from a truck chassis, an intermediate slide section 82 telescoped in and movable vertically relative to mast 80, an inner slide section 84 telescoped in and movable vertically relative to intermediate section 82 and a carriage 86 movable vertically along inner section 84. Transversely spaced rails of each mast section are connected by means of a plurality of cross braces 90, 94 and 98 to form rigid unitary mast structure. A multiple ram type extensible fluid motor 100 is mounted from the base of the assembled upright assembly, is connected to the inner mast section 84 by one of the inner telescopic tube members 102 along which an intermediate tube member 104 is actuatable to elevate carriage 86 by means of a pair of primary chains and sprockets 106 connected at their one ends to carriage 86 and at the opposite ends to an anchor plate 108 which is secured to an outer tube 110 of the hydraulic ram assembly 100. A pair of secondary chains 112 are secured from the top of outer mast section 80 and are reeved under a pair of sprockets 114 mounted near the bottom of intermediate mast section 82.

By supplying pressurized fluid to telescopic ram motor 100, assuming that the upright is in the collapsed condition shown, the ram member 104 will first be actuated to move carriage 86 from its ground level position to the top of the collapsed mast section by means of primary chains 106, following which the fluid ram motor 100 continues to extend in known manner its various cylindrical tube ram sections, including cylindrical ram members 102, 104 and 110, in order to extend upwardly the mast sections 82 and 84 to a maximum elevation with the fork carriage 86 located at the top thereof as illustrated in FIG. 6 of the prior patent.

While no load engaging means has been shown mounted on carriage 86, it will be understood that a variety of attachments may be mounted thereon, some of which utilize one or more fluid motors so as to require means of conveying pressurized fluid from a source, such as a pump, mounted in the body of the lift truck to the attachment, as well as to supply electric control devices such as solenoid valves and the like, which may for example, be used in conjunction with such fluid motors for operating such attachments.

Pressurized fluid is routed in and about the upright assembly by means of a pair of primary flexible hoses or conduits 116 and by a pair of secondary flexible hoses or conduits 118. In order to convey pressurized fluid to an attachment device, we provide a hydraulic junction box 120 on the carriage which includes a plurality of ports as may be required to operate such hydraulic motors. The junction block is connected by a rigid tube 122 at each side of the carriage to a Tee fitting 124 constructed in accordance with this invention, which is mounted at 126 from the bottom of the carriage. The fluid conduit through Tee fitting 124 is connected with the primary flexible conduit 116 which is reeved over a sheave 128 and is mounted on the shaft of and adjacent to sprocket 106, and thence extends downwardly to a second such Tee fitting 130 located on each side of the upright which connects the pressure fluid through to a rigid fluid conduit 132 which in turn is connected to the inner slide section 84 by means of a bracket 134. Conduit 132 terminates at the one end of another such Tee fitting 136 which is fixed in relation to the movement of the inner mast section. Thus, there is no relative movement during operation of the upright as between junction blocks 120, 126 and Tee fittings 124 on the one hand, and pairs of Tee fittings 130 and 136 on the other hand.

The pair of secondary flexible conduits 118 are connected at their one ends to the other side of Tee fittings 136, being reeved over a pair of sheaves 140 which are mounted for rotation at the top of intermediate slide section 82, then trained around arcuate shaped guides 142 mounted from outer mast section 80 and then routed down along opposite sides of outer mast 80 through another pair of Tee fittings 146, to which each is connected by a series of clips 144 to points adjacent the lower corners of mast 80 from which each is routed to control valve means, for example, in the operator's compartment of the lift truck.

In accordance with the invention, a pair of electric lines 28 is reeved or threaded through each of the pairs of flexible conduits as 116 and 118 above-described, entry and exit to and from the conduits being made at the pairs of Tee fittings 124, 130, 136 and 146.

The only visible portions of the pairs of electric lines 28 in the application to the triple stage lift truck upright as illustrated comprises the electric line portions shown as broken lines which connect suitable control means in the operator's compartment of the lift truck to the Tee fittings 146, which lines may be secured in any suitable manner to the rear flange portions of the rails of fixed mast section 80. Following entry through fittings 146 on either side of the upright, the lines 28 are threaded through the secondary conduits 118 upwardly and inwardly around U-guides 142, sheaves 140, and thence downwardly into Tee fitting 136 from which the electric lines exit and are again visible. From fitting 136, the lines 28 are connected into Tee fittings 130 from which they extend upwardly inside of primary conduits 116 to Tee fittings 124 from which the lines again exit as shown to connect to any suitable electric operated device on carriage 86.

As previously noted, there is no movement which requires any exposed portion of the electric lines 28 to be displaced from the relative positions shown to, from, and between the various Tee fittings during operation of the upright from the fully collapsed position illustrated to a maximum position of elevation as shown in FIG. 6 of U.S. Pat. No. 3,481,498, supra. Thus, the problems outlined initially herein in respect of lift truck uprights are completely avoided, and all of the advantages of the invention are realized fully in such an application thereof.

It will be understood that in applications, such as lift trucks and machine tools, relatively high hydraulic pressures are utilized which require substantial holding and sealing forces which are readily available by means of the present invention in the use of the novel fitting portion through which the electric lines extend from outside to inside, or inside to outside, a fluid pressure conduit.

Although I have described and illustrated certain preferred embodiments of my invention, it will be understood by those skilled in the art that modifications may be made in the structure, form and relative arrangement of parts without necessarily departing from the spirit and scope of the invention. Accordingly, it should be understood that I intend to cover by the appended claims all such modifications and uses which fall within the scope of my invention.

I claim:

1. An electric line and fluid conduit assembly comprising, in combination, a fluid conduit containing a pressure fluid, a fitting forming a portion of the conduit, and electric line means extending through an element of the fitting from a location outside the conduit to the interior thereof, means securing the electric line means in said fitting element and preventing leakage of fluid from said conduit through said fitting element, said electric line means including a conductor and insulation around the conductor, and means permitting the fluid in the conduit to flow into the interior of the insulation into contact with the conductor.

2. An assembly as claimed in claim 1 wherein said conductor includes a solid strand portion and a multiple strand portion.

3. An assembly as claimed in claim 2 wherein separate conductor means connects together said solid and multiple strand portions.

4. An assembly claimed in claim 3 wherein adjacent ends of said solid and multiple strand portions are inserted into said separate conductor means which functions to splice together said solid and multiple strand portions.

5. An assembly as claimed in claim 3 plus means in said fitting adjustable to cooperate with said single strand wire for sealing conduit pressure fluid from leakage through said fitting portion and single strand wire, said separate conductor means splicing together said solid and multiple strand portions in said fitting.

6. An assembly as claimed in claim 2 wherein said solid strand portion is a single strand wire, and means in said fitting adjustable to cooperate with said single strand wire for sealing conduit pressure fluid from leakage through said fitting and single strand wire.

7. An assembly as claimed in claim 1 wherein said fitting includes a fixed means, a means adjustable longitudinally of the fixed means and deformable means intermediate the fixed and adjustable means having a longitudinal opening through which extends the electric line means, the deformable means imposing on the electric line means increasing holding and sealing forces as the adjustable means is adjusted in one direction on the fixed means.

8. An assembly as claimed in claim 7 wherein the fitting has three entrances, two of which are included in said portion of the conduit, and the third of which is said fitting element, said adjustable means including a threaded nut adjustable longitudinally of said fixed means and a plug of relatively non-deformable material intermediate the nut and the deformable means and having a surface of revolution which mates with a complementary surface of revolution of said deformable means for transferring said forces to said electric line means.

9. An assembly as claimed in claim 1 wherein the fluid conduit is flexible and adapted to carry a variable pressure fluid which causes the conduit to change its length as a function of fluid pressure, that portion of said electric line means which is located in said flexible conduit being different in length than the corresponding portion of said conduit so that when the conduit varies in length, the effective length of the electric line means adapts correspondingly to the change of length of the conduit.

10. An assembly as claimed in claim 9 wherein the electric line means inside the conduit is arranged in a generally serpentine pattern longitudinally of at least a portion of the conduit.

11. An assembly as claimed in claim 10 wherein said electric line means comprises a pair of electric lines, the conductor of each of which includes a solid strand portion and a multiple strand portion, and separate conductor means connecting together said solid and multiple strand portions in each electric line.

12. An assembly as claimed in claim 11 wherein each said separate conductor means functions to splice together the respective solid and multiple strand portions, said separate conductor means being longitudinally displaced one from the other in the conduit in order to avoid contact with each other.

13. An assembly as claimed in claim 11 wherein the solid and multiple strand portions of each conductor are held in axially spaced relation by said separate conductor means.

14. An assembly as claimed in claim 1 wherein said conductor includes a multiple strand portion, the pressure fluid in contact therewith in the interior of the insulation tending to equalize the fluid pressure interiorly and exteriorly of the electric line means to prevent undue compacting of the multiple strand portion by fluid pressure exterior of the electric line means, said electric line means and fluid conduit being adapted to be flexed in operation.

15. An assembly as claimed in claim 14 wherein said fluid is a liquid which also tends to lubricate the strands of the multiple strand conductor whereby to increase the number of flexing cycles in the life of the conductor.

16. In an upright assembly for lift trucks and the like having a plurality of telescopically related mast sections, a load carriage means mounted for elevation on one of the mast sections and pressure fluid operated hoist motor means mounted in the upright assembly and operatively connected to the mast sections and carriage means for elevating the latter, flexible fluid pressure conduit means reeved in the upright assembly for connecting the carriage means with a source of fluid pressure during elevation thereof, flexible electric line means for connecting the carriage means with a source of electricity during elevation thereof and being reeved inside of the fluid conduit means for flexure therewith during operation of the upright assembly, said electric line means including a conductor and insulation around the conductor, and means permitting the fluid in the conduit to flow into the interior of the insulation into contact with the conductor to tend to equalize the fluid pressure interior and exterior of the electric line means.

17. An upright assembly as claimed in claim 16 wherein coupling means is located at one or more predetermined locations in the upright assembly and couples the conduit means and the electric line means in such a manner that the electric line means enters the conduit means and is reeved as aforesaid inside of the same in the upright assembly, said coupling means including pressure sealing and holding means through which the electric line means extends from a location outside the conduit to a location inside the conduit, and vice versa.

18. An upright assembly as claimed in claim 17 wherein said coupling means is located in pairs at one or more locations in the upright, each one of each of said one or more pairs being immovable relative to the other one of each said pairs, said electric line means extending between each such one or more pairs externally of said flexible conduit.

19. An upright assembly as claimed in claim 16 wherein said conductor comprises a multiple strand portion, the pressure fluid inside said insulation lubricating the strands of said conductor and minimizing compaction of said strands whereby to increase the flexing life of the conductor in operation of the upright assembly.

20. An upright assembly as claimed in claim 19 wherein said conductor includes also a solid strand portion spliced to said multiple strand portion and cooperating with said coupling means for preventing pressure fluid leakage therethrough.

* * * * *